US008045479B2

(12) United States Patent
Russell et al.

(10) Patent No.: US 8,045,479 B2
(45) Date of Patent: Oct. 25, 2011

(54) METHOD AND SYSTEM OF TESTING VIDEO ACCESS DEVICES

(75) Inventors: Sam Russell, Tinton Falls, NJ (US); Paritosh Bajpay, Edison, NJ (US); David H. Lu, Morganville, NJ (US); Shiu Y. Chong, Fair Haven, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 204 days.

(21) Appl. No.: 11/968,329

(22) Filed: Jan. 2, 2008

(65) Prior Publication Data
US 2009/0168658 A1 Jul. 2, 2009

(51) Int. Cl.
H04L 1/24 (2006.01)
(52) U.S. Cl. ........................................ 370/251; 370/241
(58) Field of Classification Search ........................ None
See application file for complete search history.

(56) References Cited

U.S. PATENT DOCUMENTS

| 6,205,143 | B1 | 3/2001 | Lemieux |
| 6,320,939 | B1* | 11/2001 | Nulty et al. ................ 379/27.01 |
| 6,414,960 | B1 | 7/2002 | Kuhn et al. |
| 6,978,015 | B1* | 12/2005 | Erickson et al. ............. 379/417 |
| 7,085,238 | B2 | 8/2006 | McBeath |
| 7,181,360 | B1 | 2/2007 | Nikolac et al. |
| 7,212,496 | B1 | 5/2007 | Chong |
| 7,245,701 | B2 | 7/2007 | Tennyson et al. |
| 7,349,345 | B1* | 3/2008 | Hansen et al. ................ 370/242 |
| 7,550,988 | B2* | 6/2009 | Schroth et al. ................ 324/765 |
| 2003/0093563 | A1 | 5/2003 | Young et al. |
| 2003/0182666 | A1 | 9/2003 | You |
| 2005/0232153 | A1 | 10/2005 | Bishop et al. |
| 2006/0067237 | A1* | 3/2006 | Burns et al. .................... 370/241 |
| 2007/0121792 | A1 | 5/2007 | Chong |
| 2007/0288822 | A1* | 12/2007 | Lin et al. ......................... 714/741 |
| 2008/0320560 | A1* | 12/2008 | Casey et al. ....................... 726/3 |
| 2009/0003221 | A1* | 1/2009 | Burns et al. .................... 370/241 |
| 2009/0161566 | A1* | 6/2009 | Sridhar et al. ................. 370/252 |

OTHER PUBLICATIONS

Spirent SmartSight: Automated Testing and Diagnostics for Triple Play Service Assurance, Sprirent Communications, Inc., 2003.

* cited by examiner

Primary Examiner — Huy Vu
Assistant Examiner — Benjamin Lamont
(74) Attorney, Agent, or Firm — Guntin Meles & Gust, PLC

(57) ABSTRACT

A test controller operable to test a video access device can include a first port coupled to particular test equipment and a second port coupled to video access devices. Each video access device can include a wideband link and a test port. The particular test equipment and each of the video access devices can be remotely located as compared to one another. The test controller can include a processor that is operable to send a command to connect the test port of a first particular video access device of the video access devices to its corresponding wideband link, and establish connectivity between the test equipment and a second particular video access device of the video access devices. The test controller can be part of a system that includes methods used to test video access devices.

18 Claims, 6 Drawing Sheets

METHOD AND SYSTEM OF TESTING VIDEO ACCESS DEVICES

FIELD OF THE DISCLOSURE

The present disclosure generally relates to networks or methods of using the same, and more particularly relates to methods and systems of testing video access devices.

BACKGROUND

Delivery of services provided to customers of a network is becoming more competitive as the number of service offerings increases. Many service providers provide telephone services, Internet access, video services, other appropriate services, or any combination thereof to customers. These services may be provided to the customer's premises via a packet-switched network.

Currently, networks of the service providers are expanding, thus, requiring video access devices, such as digital subscriber line access multiplexers, to be installed at locations remote to a service provider's offices, such as a central office. The video access devices can be located within neighborhoods that support a set of customers. As each video access device is installed or has problems, a technician typically needs to be dispatched to test the video access device.

When a technician is dispatched, the service provider incurs significant costs related travel time to and from the remote location where a particular video access device is located. Issues with test equipment can also arise. Each video access device or each technician may have their own test equipment, resulting in many sets of the same test equipment. Many video access devices are located within housings that are exposed to outdoor ambients. The test equipment may be sensitive to some environments (temperature, moisture, etc.). Also, technicians need to be trained to use the test equipment. The various issues with dispatching technicians and test equipment can significantly impact a service provider's ability to expand an existing network, promptly address a problem or service call, or the like. Such issues can result in increased costs to the service provider, inability to add new customers as quickly as desired, loss of existing customers due to problems taking significant time to address, or the like.

BRIEF DESCRIPTION OF THE DRAWINGS

Skilled artisans will appreciate that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, understand that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
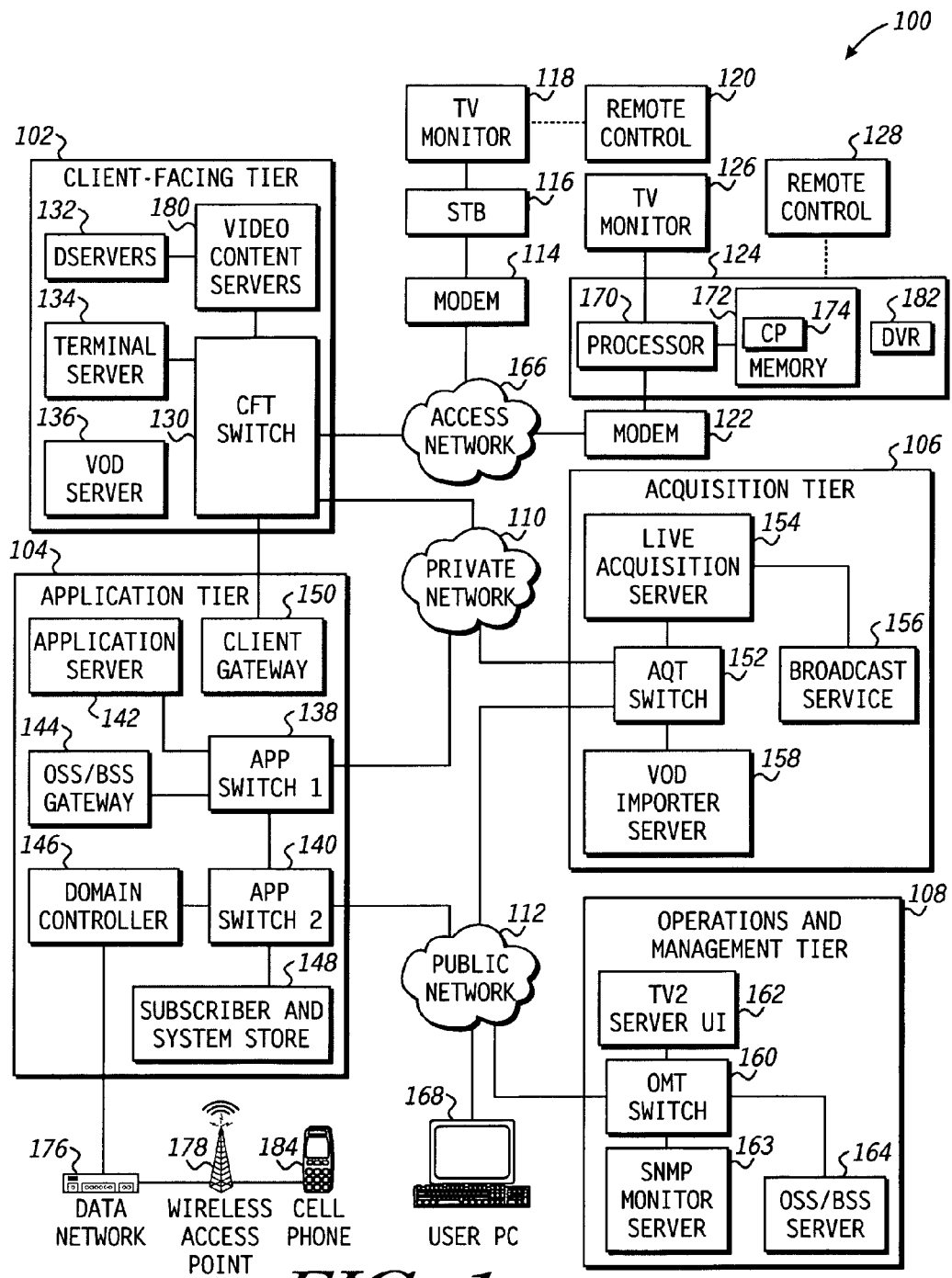
FIG. 1 includes a block diagram illustrating an embodiment of an Internet protocol television system.

FIG. 1 includes an illustration of an Internet protocol television ("IPTV") system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to a public network, such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an IPTV network. In an illustrative embodiment, modems, such as a first modem 114 and a second modem 122, can be coupled to the private access network 166. The client-facing tier 102 can communicate with a first representative set-top box ("STB") device 116 via the first modem 114 and with a second representative STB device 124 via the second modem 122. The client-facing tier 102 can communicate with a large number of STBs over a wide geographic area, such as a regional area, a metropolitan area, a viewing area, or any other suitable geographic area that can be supported by networking the client-facing tier 102 to numerous STB devices. In one embodiment, the client-facing tier 102 can be coupled to the modems 114 and 122 via fiber optic cables. Alternatively, the modems 114 and 122 can be digital subscriber line ("DSL") modems that are coupled to one or more network nodes via twisted pairs, and the client-facing tier 102 can be coupled to the network nodes via fiber-optic cables. Each STB device 116 and 124 can process data received from the private access network 166 via an IPTV software platform, such as Microsoft® TV IPTV Edition.

The first STB device 116 can be coupled to a first display device 118, such as a first television monitor, and the second STB device 124 can be coupled to a second display device 126, such as a second television monitor. Moreover, the first STB device 116 can communicate with a first remote control 120, and the second STB device can communicate with a second remote control 128. In an exemplary, non-limiting embodiment, each STB device 116 and 124 can receive data or video from the client-facing tier 102 via the private access network 166 and render or display the data or video at the display device 118 or 126 to which it is coupled. The STB devices 116 and 124 thus may include tuners that receive and decode television programming information for transmission to the display devices 118 and 126. Further, the STB devices 116 and 124 can include an STB processor 170 and an STB memory device 172 that is accessible to the STB processor. In a particular embodiment, the STB devices 116 and 124 can also communicate commands received from the remote controls 120 and 128 back to the client-facing tier 102 via the private access network 166.

In an illustrative embodiment, the client-facing tier 102 can include a client-facing tier ("CFT") switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand ("VOD") content. The CFT switch 130 can also be coupled to a terminal server 134 that provides terminal devices, such as a game application server and other devices with a common connection point to the private network 110. In a particular embodiment, the CFT switch 130 can also be coupled to a VOD server 136.

The application tier 104 can communicate with both the private network 110 and the public network 112. In this embodiment, the application tier 104 can include a first application tier ("APP") switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the STB devices 116 and 124 via the private access network 166, so the STB devices 116 and 124 can provide functions, such as display, messaging, processing of IPTV data and VOD material. In a particular embodiment, the OSS/BSS gateway 144 includes operation systems and support ("OSS") data, as well as billing systems and support ("BSS") data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the STB devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen STB devices, from accessing the private network 110, by denying access to these devices beyond the private access network 166.

For example, when the STB device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the STB device 116 access to IPTV content and VOD content. If the client gateway 150 cannot verify subscriber information for the STB device 116, such as because it is connected to a different twisted pair, the client gateway 150 can deny transmissions to and from the STB device 116 beyond the private access network 166.

The acquisition tier 106 includes an acquisition tier ("AQT") switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch 152 can be coupled to a VOD importer server 158 that stores television content received at the acquisition tier 106 and communicate the stored content to the client-facing tier 102 via the private network 110.

The operations and management tier 108 can include an operations and management tier ("OMT") switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol ("SNMP") monitor 163 that monitors network devices. In a particular embodiment, the OMT switch 160 can communicate with the AQT switch 152 via the public network 112.

In a particular embodiment, during operation of the IPTV system, the live acquisition server 154 can acquire television content from the broadcast service 156. The live acquisition server 154 in turn can transmit the television content to the AQT switch 152, and the AQT switch 152 can transmit the television content to the CFT switch 130 via the private network 110. Further, the television content can be encoded at the D-servers 132, and the CFT switch 130 can communicate the television content to the modems 114 and 122 via the private access network 166. The STB devices 116 and 124 can receive the television content from the modems 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the STB device 116 or 124, the request can be transmitted over the private access network 166 to the VOD server 136 via the CFT switch 130. Upon receiving such a request, the VOD server 136 can retrieve requested VOD content and transmit the content to the STB device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer ("PC") 168 coupled to the public network 112.

The domain controller 146 communicates with the public network 112 via the second APP switch 140. Additionally, the domain controller 146 can communicate via the public network 112 with the PC 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 180.

In a particular embodiment, the STB devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second STB device 124. For instance, in an illustrative embodiment, the account information can relate the user's account to the second STB device 124 by associating the user account with an IP address of the second STB device 124, with data relating to one or more twisted pairs connected with the second STB device 124, with data related to one or more fiber optic cables connected with the second STB device 124, with an alphanumeric identifier of the second STB device 124, with any other data that is suitable for associating second STB device 124 with a user account, or with any combination of these.

Figure 2:
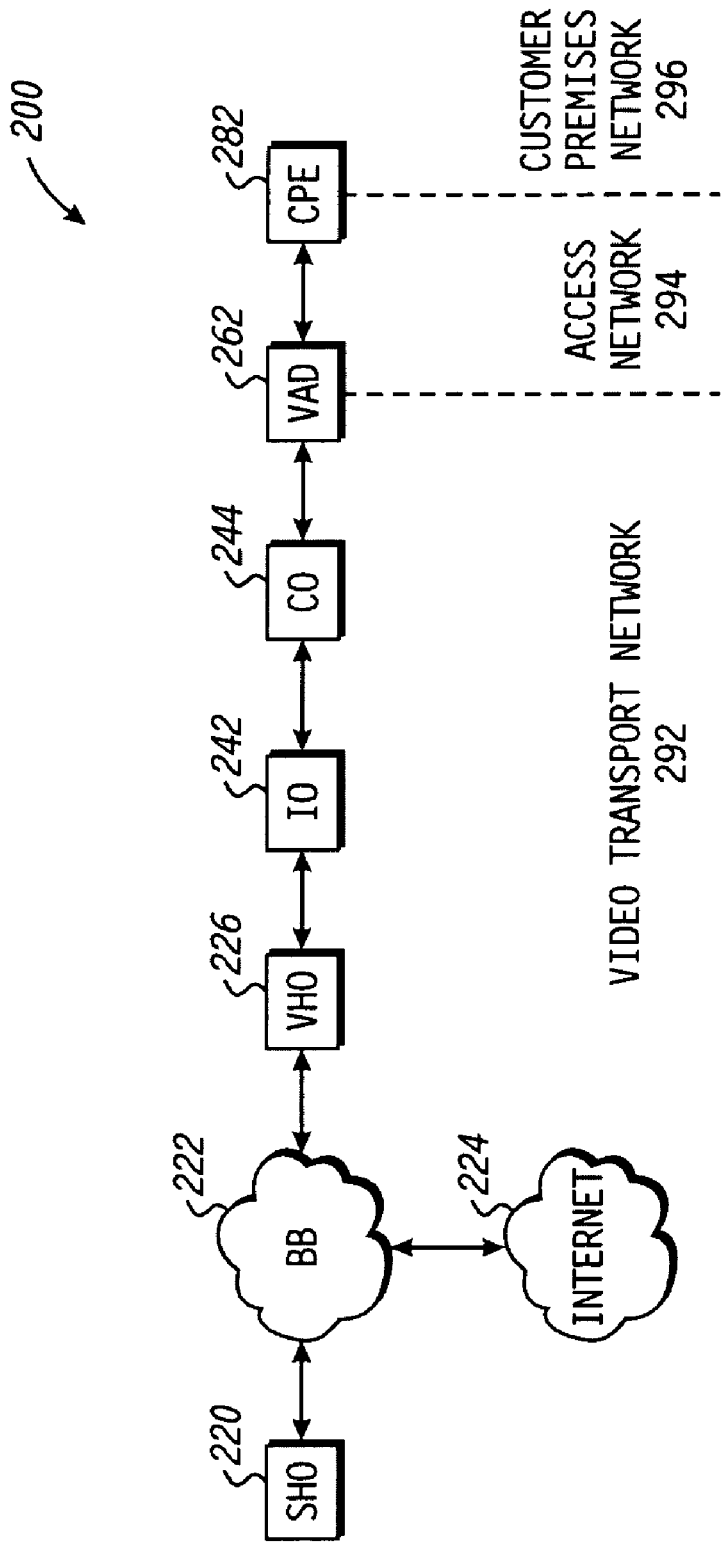
FIG. 2 includes a block diagram illustrating some of the connections between the customer premises and other portions of a network that supports the Internet protocol television system.

FIG. 2 includes an illustration of a portion of an exemplary network 200 that can be used to deliver digital content, such as IPTV using the IPTV system 100 in FIG. 1, to a customer. The network can include a super hub office ("SHO") 220 that is bidirectionally coupled to an Internet protocol backbone ("BB") 222 that is bidirectionally coupled to each of the Internet 224 and a video hub office ("VHO") 226. In one embodiment, streaming video content provided from national broadcasting networks (e.g., ABC™, CBS™, CNN™, HBO™, etc.) can be sent to and received by the SHO 220. Streaming video content from local broadcasting networks can be sent to and received by the VHO 226. VOD content can be received by and stored within the VHO 226. Internet access can be established via the BB 222 to the Internet 224. Such Internet access can be useful for obtaining files, making calls, requesting other content, or any combination thereof by a customer at the customer premises.

Continuing with the network 200, an intermediate office ("IO") 242 is bi-directionally coupled to the VHO 226 and a central office ("CO") 244. The CO 244 is bidirectionally coupled to a video access device ("VAD") 262. The VAD 262 can be a digital subscriber line access multiplexer, a video ready access device, or the like. The video access ready device is similar to the digital subscriber line access multiplexer but the video access ready device is particularly designed for streaming broadcast video for IPTV. The VAD 262 is bidirectionally coupled to customer premises equipment ("CPE") 282.

Portions of the network 200 can be broken down into smaller networks for purposes of maintaining the network 200. For example, the portion of network 200 that is upstream of the VAD 262 can be referred to as the video transport network, the portion of the network 200 from the VAD 262 to the customer premises can be referred to as the access network, and the portion of the network 200 within the customer premises can be referred to as the customer premises network.

After reading this specification, skilled artisans will appreciate that many different network configurations are possible. For example, VOD content may be accessed by a customer via the Internet 224 or the SHO 220, instead of the VHO 226. No intermediate office or a plurality of intermediate offices similar to the IO 242 may be used. More than one SHO or VHO may also be used. Thus, the particular implementation of a network used to provide services to a customer is variable and can be tailored to the needs or desires of a network operator. Therefore, the network 200 in FIG. 2 is merely for purposes of illustration and is not to be construed as limiting the scope of the present invention.

Figure 3:
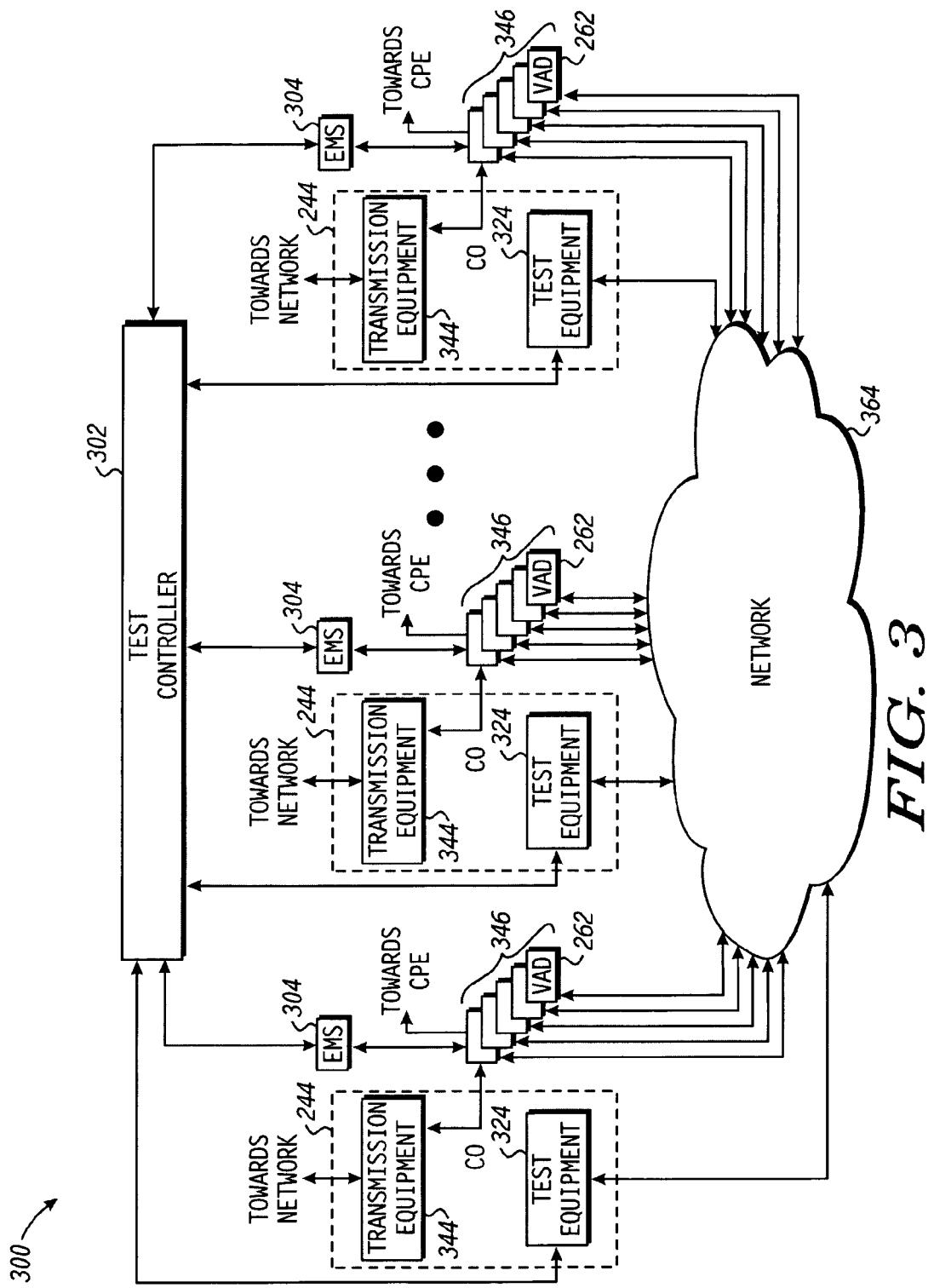
FIG. 3 includes a block diagram illustrating an exemplary video testing system.

FIG. 3 includes an illustration of an exemplary testing system 300 that can test a plurality of VADs. The system 300 includes a test controller 302 that is bidirectionally coupled to element management systems ("EMSs") 304 and test equipment 324 at the COs 244. Each EMS 304 is bidirectionally coupled to a set 346 of VADs 262 at each CO 244. The EMS 304 can receive commands from the test controller 302. The EMS 304 has access to the VADs 262 coupled to it, can send instructions to each VAD 262 that correspond to the commands received from the test controller 302, has configuration status information regarding VADs coupled to it, and can redirect an incoming video stream at the VADs 262, as will be described with respect to FIG. 4. In a particular embodiment, the EMS 304 can include a server or other computing device. Each VAD 262 has a wideband link, customer premises links, and a test port. The wideband link is a communication link towards the broadcast transmission equipment, and the customer premises links are links towards the customers' premises. The test port is a port that allows the VAD 262 to communicate to and with the test equipment 324. More details regarding the VAD 262 and its ports are described with respect to FIG. 4.

In one embodiment, each of the test controller 302, test equipment 324, and each VAD 262 within the set 346 of VADs 262 are located remotely from one another. In a particular embodiment, the test controller 302 may be located within a work center. The test controller 302 may be the only test controller for the entire network. In such an embodiment, the test controller 302 can be a central test controller. In another embodiment, more than one test controller 302 or more or fewer EMSs 304 can be used. In still another embodiment, the number of EMSs 304 may be greater or less than the number of COs 244, as 1:1 correspondence of EMS 304 to CO 244 is not required.

The EMSs 304 can be located nearly anywhere in network. In a particular embodiment, the EMSs 304 are located in the work center with the test controller 302, and in another embodiment are co-located with test equipment 324. The test equipment 324 can be co-located with other equipment in the network 200 (FIG. 2) upstream from the VAD 262. For example, the test equipment 324 can be located in CO 244, IO 242, VHO 226, SHO 220, or another suitable location that also has other equipment, such as transmission equipment 344. Although not illustrated, the transmission equipment 344 can be coupled to each VAD 262 within the set 346 of VADs. In a particular location, the test equipment is located in a premises that includes transmission equipment 344 just upstream from the VADs 262, namely at the CO 244.

Each VAD 262 can be located between its corresponding CO 244 and the CPEs 282 supported by the particular VAD 262. In one embodiment, a particular VAD 262 is coupled to many CPEs 282 and is coupled to transmission equipment 344 at the CO 244, and the transmission equipment 344 at the CO 244 is coupled to different sets 346 of VADs 262, one set 346 of which is illustrated in FIG. 3. Each VAD 262 can be physically located within a housing, wherein the housing is exposed to an outdoor ambient. Thus, each VAD 262 can be close to a neighborhood that it supports. Because the VADs 262 are remotely located, part of the value of the test system 300 is that it allows testing of a VAD 262 without having to dispatch a technician to the VAD 262. Further, test equipment 324 does not have to be installed at each VAD 262. Test equipment 324 can be shared between different VADs 262. Therefore, significant savings can be achieved by having fewer sets of test equipment. The VADs 262 are coupled to the test equipment 324 via a public or private network 364. In a particular embodiment, the test port of the VAD is bidirectionally coupled to the network 364, which in turn, is bidirectionally coupled to the test equipment 324.

Figure 4:
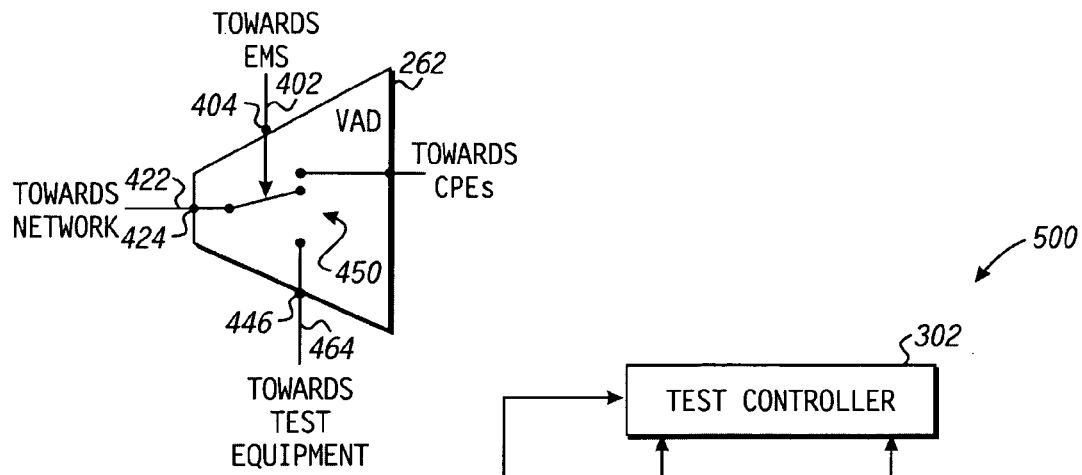
FIG. 4 includes a block diagram illustrating a video access device within the exemplary video testing system of FIG. 3.

FIG. 4 includes an illustration of a VAD 262 and its relationships between other parts of the test system 300. The VAD 262 includes the wideband link 424 that is connected to a broadcast transmission line 422. The VAD 262 also includes a control port 404 that is connected to a control line 402 that is coupled to an EMS 304 (not illustrated in FIG. 4). The VAD 262 further includes a test port 446 that is connected to a test line 464 that is coupled to test equipment 324 (not illustrated in FIG. 4). In a particular embodiment, the test port 446 can be an ethernet port, and the test line 464 can be a category 5 ("Cat 5") cable. The VAD 262 can include hardware, firmware, software, or any combination thereof to allow the VAD 262 to properly interact or otherwise interface with the test controller 302, EMS 304, and test equipment 324 when the VAD 262 is being tested using the test system 300. In a particular embodiment, the VAD 262 can be configured to allow some or all content transmitted from the wideband link 424 to be directed to the test port 446. In a particular embodiment, the VAD 262 can include a switch 450 that is capable of directing content from the wideband link 424 towards the CPEs or to the test port 446. The switch can be controlled by a signal received at the control port 404 from the control line 402 (from the EMS).

Figure 5:
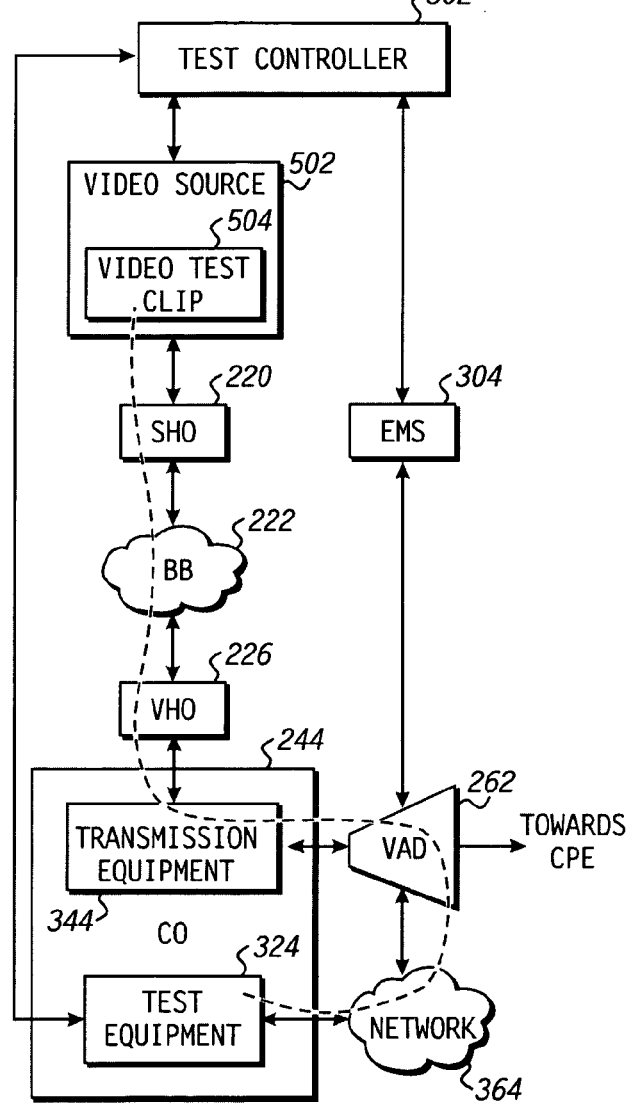
FIG. 5 includes a block diagram illustrating a video transmission system in which the exemplary video testing system of FIG. 3 has been implemented.

FIG. 5 includes an illustration of a more comprehensive system 500 that allows video content to be transmitted along a longest path that a broadcast would normally travel over a service provider's network to a particular VAD 262. Many of the parts of the test system 500 have been previously described in FIGS. 2, 3, and 4. The test system 500 further includes a video source 502 that is bidirectionally coupled to the test controller 302. In one embodiment, the test controller 302 has access to the video source 502 to select a particular video test clip 504, which may or may not be within a library of test clips, the timing associated with the transmission, and whether to transmit the particular test clip 504 continuously or intermittently at regular intervals.

In one embodiment, the SHO 220 can allow for a dedicated test channel that operates some or all of the time. The video source 502 may provide a video test clip 504 or other video content that can be used to test the system 500. In this manner, the testing may replicate more closely the transmission path that broadcast video from network broadcasters will experience. In another embodiment (not illustrated), the video source 502 may be coupled to a point closer to the VAD 262. For example, if a VOD system is being tested, the video source 502 may bypass the SHO 220 and 222 and be introduced at VHO 226. After reading this specification, skilled artisans will appreciate that the video source 502 can introduce the video test clip 504 even further downstream.

In FIG. 5, the dashed line represents a path that video content can travel when using the system 500 in accordance with an exemplary, non-limiting embodiment. A video test clip 504 can be introduced into the system 500 at the SHO 220. The video test clip 504 can be transmitted through the BB 222, the VHO 226, and the transmission equipment 334 at the CO 244 to the VAD 262. A control signal from the test controller 302 can be sent to the VAD 262, via the EMS 304, to redirect the video signal incoming to the VAD 262 to the test port 446 (in FIG. 4) of the VAD 262. The VAD video signal (i.e., video signal transmitted by the VAD 262) is transmitted through the network 364 and received by the test equipment 324 at the CO 244.

Particular features of some components are further described. The test controller 302 is operable to control testing. More specifically, the test controller 302 can store the topology information, establish and maintain connectivity to EMSs 304 and test equipment 324 in COs 244 or elsewhere upstream from the VADs 262, send commands to connect and disconnect the test port 446 to or from its corresponding wideband link 424, establish connectivity from test equipment 324 to the test port 446 via the network 364, access measurements made by test equipment 324, create comparative reports of results, perform another suitable function, or any combination thereof.

In one embodiment, the system 500 can allow a video test clip 504 to run from SHO 220 to customer premise equipment 282, thus creating the conditions closer to those conditions experienced when receiving a broadcast over a broadcast channel. The video test clip 504 can be stored in the video source 502. The test clip can be in MPEG-2, MPEG-4, or another digital format. In one embodiment, the video test clip 504 can broadcast only when testing, and thus, the transmission may only be made on an as-needed basis.

Figure 6:
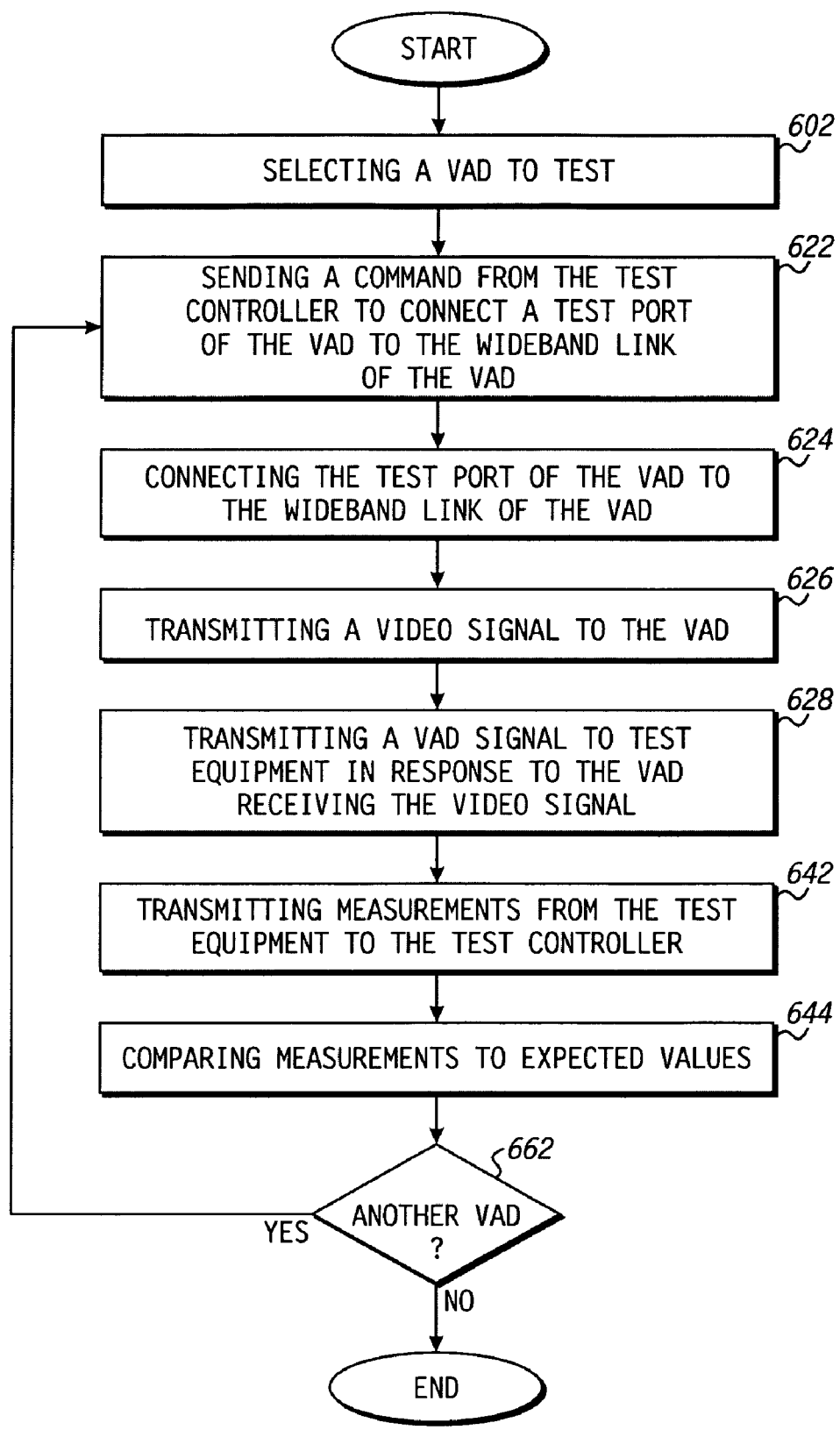
FIG. 6 includes a flow diagram illustrating a method of testing transmission of video content to a video access device.

Attention is now directed to an exemplary, non-limiting method of using a system described herein to test one or more VADs, as illustrated in the flow chart of FIG. 6. The method will be described in reference to FIGS. 3 to 5. After reading this specification, skilled artisans will appreciate that many different methods can be used and not depart from the concepts described herein.

The method can include selecting a VAD to test, at block 602 in FIG. 6. The test controller 302 may make the selection. In another embodiment, another component within the system, e.g. the EMS 304, or an operator of the system may make the selection. In still another embodiment, the selection can be made in response to a VAD initially becoming part of the system or when a VAD sends an error message or an alert to another part of the system 500.

The method can also include sending a command from the test controller to connect a test port of the VAD to a wideband link of the VAD, at block 622. The method can further include connecting a test port of the VAD to a wideband link of the VAD, at block 624. Referring to FIGS. 3 and 4, the EMS 304 can instruct the particular VAD 262 to connect the test port 446 to the wideband link 424. This can allow incoming video received at the particular VAD 262 to be routed outside of the particular VAD 262 via test port 446.

The method can include transmitting a video signal to the VAD, at block 626. Referring to FIG. 5, the test controller 302 can instruct the video source 502 to transmit a test video clip via the SHO 220. The video signal can be routed through the system 500 and be received at the particular VAD 262 within the set 346 of VADs. The method can also include transmitting a VAD signal to test equipment in response to the VAD receiving the video signal, at block 628 in FIG. 6. Ideally, the video signal and the VAD signal are the same. However, noise or another factor can cause the VAD signal to differ from the video signal at the source from which it is being transmitted. The VAD signal is routed to the test port 446 of the particular VAD 262, through the network 364, and to test equipment 324 at the CO 244 for the particular VAD 262. Measurements can be taken by the test equipment 324 on the VAD signal or other data received at the test equipment 324.

The method can include transmitting measurements from the test equipment to the test controller, at block 642 in FIG. 6. In FIG. 5, the measurements can be transmitted from the test equipment 324 to the test controller 302. The test controller 302 can command the test equipment 324 to transmit the measurements, or the test equipment 324 may push the measurements without a corresponding command from the test controller 302. The method can further include comparing measurements to expected values, at block 644 in FIG. 6. The test controller 302 may already have the expected values or may access them from a database (not illustrated in FIG. 5), the video source 502, or another component within the system. The test controller 302 can perform a variety of functions depending on the comparison. The test controller 302 may perform additional tests, repairs, or issue a notice that a technician is to be dispatched to the particular VAD or elsewhere within the system 500. The test controller may also generate reports or other information regarding the system 500.

The method can further include making a determination whether another VAD is to be tested, at decision tree 662. If there is another VAD, the method can be repeated. Otherwise ("No" branch from decision tree 662), the method ends.

The system and components (e.g., the test controller 302, the EMS 304, etc.) described herein can be implemented using a general computing system, and the methods described can be carried out by the general computing system that may be located within the network.

Figure 7:
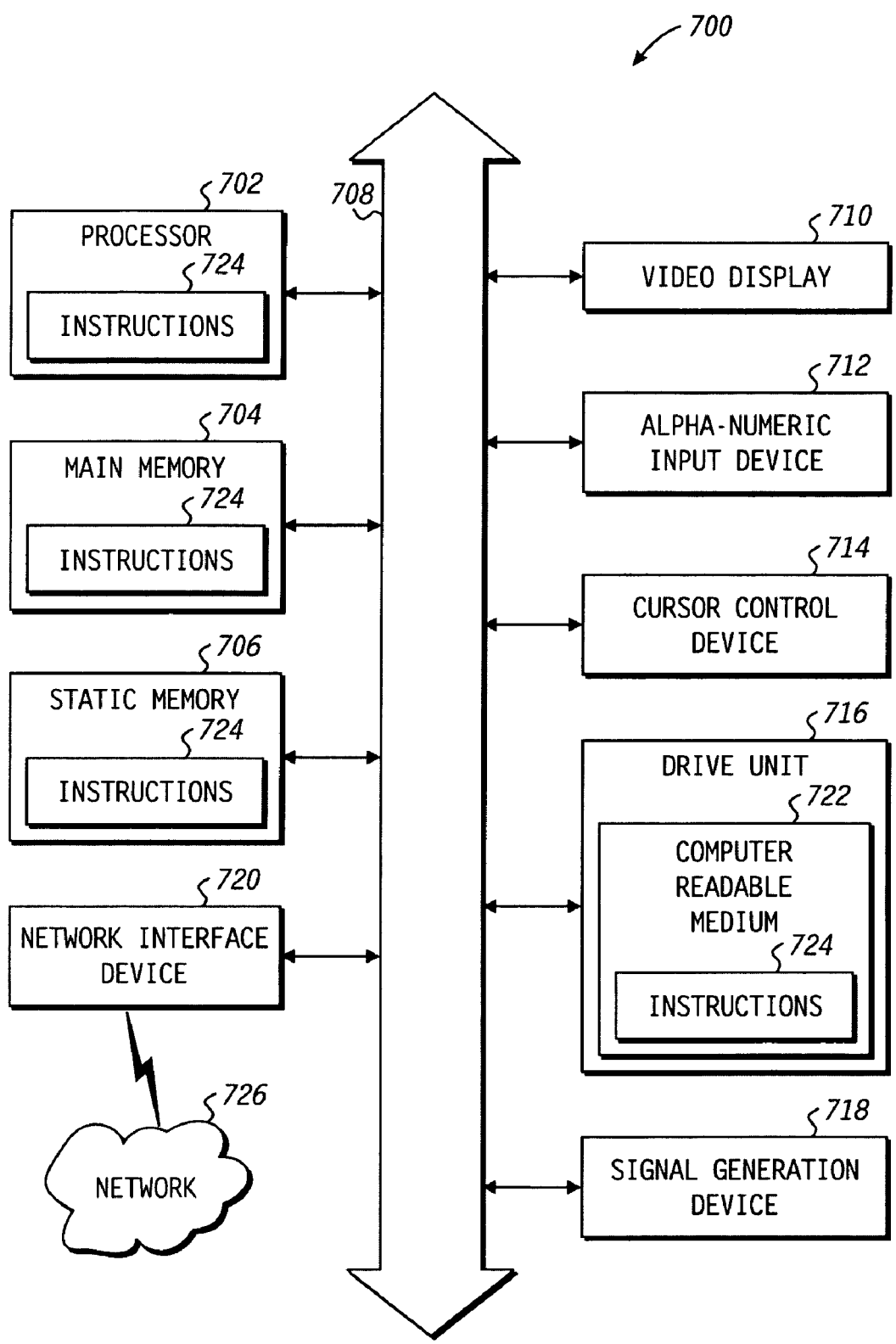
FIG. 7 includes a block diagram of an illustrative embodiment of a general computer system.

FIG. 7 includes an illustrative embodiment of a general computer system 700. The computer system 700 can include a set of instructions that can be executed to cause the computer system 700 to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a desktop PC, a laptop PC, an STB, a personal digital assistant ("PDA"), a mobile device, a palmtop computer, a laptop computer, a desktop computer, a communications device, a wireless telephone, a wireline telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit ("CPU"), a graphics processing unit ("GPU"), or both. Moreover, the computer system 700 can include a main memory 704 and a static memory 706 that can communicate with each other via a bus 708. As shown, the computer system 700 may further include a video display unit 710, such as a liquid crystal display ("LCD"), an organic light emitting diode ("OLED"), a flat panel display, a solid state display, or a cathode ray tube ("CRT"). Additionally, the computer system 700 may include an input device 712, such as a keyboard, and a cursor control device 714, such as a mouse. The computer system 700 can also include a disk drive unit 716, a signal generation device 718, such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

Embodiments described herein can be used to allow for a more automated method of testing one or more VADs 262. The system described herein can use a multiplex architecture that is easy to implement. More particular, the system multiplexes a set of test equipment 324 in the CO 244 to handle all VADs 262 managed by the CO 244. The test equipment 324 and any back-up test equipment can be provided within the CO 244 and allows for relatively quick and easy maintenance of the test equipment 324 without significant down time. In one embodiment, the test equipment 324 can be commercially available test equipment, and therefore, the test equipment 324 may not need to be customized to be used with the systems as described herein. Video test clips 504 can be transmitted over a dedicated test broadcast channel to replicate more closely the transmission path of broadcast video (e.g., IPTV broadcasts).

The method and system can help to reduce costs. One set of test equipment 324 (and potentially a backup) may be used at a centralized location, such as a CO 244. Thus, each VAD 262 or technician does not have to have its own dedicated test equipment. Because testing equipment 324 can be provided at COs 244 and networked to their corresponding VADs 262, technicians building out the VADs 262 in the system do not need to carry the test equipment 324 to the locations of the VADs 262. Still further, the technician does not need to be trained to use the test equipment 324. Testing can be carried out from a central work center or other offices of the service provider. Thus, expanding networks and addressing problems can be performed more quickly.

Many different aspects and embodiments are possible. Some of those aspects and embodiments are described below. After reading this specification, skilled artisans will appreciate that those aspects and embodiments are only illustrative and do not limit the scope of the present invention.

In a first aspect, a test controller can be operable to test a video access device. The test controller can include a first port coupled to particular test equipment and a second port coupled to video access devices. Each of the video access devices can have a wideband link and a test port. The particular test equipment and each of the video access devices can be remotely located as compared to one another. The test controller can also include a processor operable to send a command to connect the test port of a first particular video access device of the video access devices to its corresponding wideband link, and establish connectivity between the test equipment and the first particular video access device of the video access devices.

In one embodiment of the first aspect, the test controller is coupled to an element management system that is coupled to the video access devices. In another embodiment, the test controller further includes a video source control port that is coupled to a video source. In still another embodiment, the first port is coupled to other test equipment that is coupled to other video access devices that are not coupled to the particular test equipment. In yet another embodiment, the processor is further operable to establish connectivity between the test ports of the video access devices and the particular test equipment. In a further embodiment, the processor is further operable to access measurements from the particular test equipment.

In a second aspect, a system can be used to test video access devices. The system can include particular test equipment and the video access devices each having a wideband link and a test port. The particular test equipment and each of the video access devices can be remotely located as compared to one another. The system can also include an element management system coupled to each of the video access devices. The system can further include a test controller that is coupled to the particular test equipment and the element management system, wherein the test controller is operable to send a command to connect the test port of a first particular video access device of the video access devices to its corresponding wideband link, and establish connectivity between the test equipment and the first particular video access device of the video access devices.

In one embodiment of the second aspect, the system further includes a video source coupled to the test controller, wherein the test controller is further operable to send a command to the video source to transmit a test video signal to the particular access device. In a particular embodiment, the system is configured to allow the test video signal to be transmitted through the longest broadcast transmission path of a service provider to the particular video access device. In another embodiment, the test controller is operable to collect and store topology information with respect to the particular test equipment and its corresponding video access devices. In still another embodiment, the test controller is further operable to access measurements of the particular test equipment. In yet another embodiment, the test controller is coupled to other test equipment, wherein each set of the other and particular test equipment has a unique corresponding set of video access devices.

In a further embodiment of the second aspect, the video access devices include a particular video access device that is disposed within a housing, wherein the housing is exposed to an outdoor ambient. In still a further embodiment, the test equipment is located within a central office.

In a third aspect, a method of testing video access devices can include connecting a test port of a first video access device to a wideband link of the first video access device. The method can also include transmitting a video signal to the first video access device, and transmitting a first video access device signal to test equipment in response to the first video access device receiving the video signal. The test equipment can be remotely located from the first video access device. The method can also include transmitting a first measurement from the test equipment to a test controller.

In one embodiment of the third aspect, the method further includes sending a command from the test controller to an element management system to execute instructions to perform connecting the test port to the wideband link. In another embodiment, the method further includes sending a command from the test controller to a video source to transmit the video signal, wherein transmitting the video signal is performed in response to the video source receiving the command. In a particular embodiment, the video signal is transmitted from a super hub office or a video hub office. In a more particular embodiment, the video signal is associated with a dedicated test channel. In another more particular embodiment, the video signal is part of a test video clip.

In a further embodiment of the third aspect, the video access device is disposed within a housing, wherein the housing is exposed to an outdoor ambient, and the test equipment is located within a central office. In still a further embodiment, the method further includes connecting a test port of a second video access device to a wideband link of the second video access device, transmitting the video signal to the second video access device, transmitting a second video access device signal to the test equipment in response to the second video access device receiving the video signal, wherein the test equipment is remotely located from the second video access device, and transmitting a second measurement from the test equipment to a test controller. The test equipment can be stationary during and between times when the first and second video access device signals are received by the test equipment.

A processor readable medium can include code. The code can include instructions for a processor to carry out any part or all of the methods described herein.

Note that not all of the activities described above in the general description or the examples are required, that a portion of a specific activity may not be required, and that one or more further activities may be performed in addition to those described. Still further, the order in which activities are listed are not necessarily the order in which they are performed.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A test controller configured to test a video access device, the test controller comprising:
   a first port coupled to particular test equipment, wherein the test controller is also coupled to other test equipment;
   a second port coupled to video access devices, wherein:
   each video access device includes a particular video access device that is disposed within a housing, wherein the housing is exposed to an outdoor ambient;
   each video access device having a wideband link and a test port;
   wherein the test equipment is located within a central office and wherein the video access devices each comprise a switch that directs content from the wideband link towards a customer premise equipment device or to the test port of the video access device and wherein the switch is controlled by a signal received at a control port of the video access device from the element management system; and
   the particular test equipment and each of the video access devices are remotely located as compared to one another, wherein each set of the other test equipment and the particular test equipment has a separate corresponding set of video access devices, and the test controller corresponds to each of the video access devices;
   wherein the test controller is coupled to an element management system that is bi-directionally coupled to the video access devices; and
   a processor that:
   receives an error message from a first particular video access device;
   sends a command to connect the test port of the first particular video access device of the video access devices to its corresponding wideband link in response to receiving the error message; and
   establishes connectivity directly between the particular test equipment and the first particular video access device of the video access devices in response to receiving the error message.

2. The test controller of claim 1, wherein the test controller is bi-directionally coupled to an element management system that is bi-directionally coupled to the video access devices.

3. The test controller of claim 1, further comprises a video source control port that is coupled to a video source.

4. The test controller of claim 1, wherein the processor is further configured to establish connectivity between the test ports of the video access devices and the particular test equipment.

5. The test controller of claim 1, wherein the processor is further configured to access measurements from the particular test equipment.

6. A system to test video access devices, the system comprising:
   particular test equipment;
   the video access devices each having a wideband link and a test port, wherein the particular test equipment and each of the video access devices are remotely located as compared to one another and wherein the video access devices include a particular video access device that is disposed within a housing, wherein the housing is exposed to an outdoor ambient;
   wherein the test equipment is located within a central office and wherein the video access devices each comprise a switch that directs content from the wideband link towards a customer premise equipment device or to the test port of the video access device and wherein the switch is controlled by a signal received at a control port of the video access device from the element management system;
   an element management system bidirectionally coupled to each of the video access devices; and a test controller that is coupled to the particular test equipment and the element management system, wherein the test controller:
   detects that a first particular video access device has initially become part of the system;
   sends a command to connect the test port of the first particular video access device of the video access devices to its corresponding wideband link in response to detecting the first particular video access device;
   establishes connectivity directly between the test equipment and the first particular video access device of the video access devices in response to detecting the first particular video access device; and
   receives measurements transmitted from the particular test equipment.

7. The system of claim 6, further comprising a video source coupled to the test controller, wherein the test controller sends a command to the video source to transmit a test video signal to the particular access device.

8. The system of claim 7, wherein the system is configured to allow the test video signal to be transmitted through a longest distance broadcast transmission path of a service provider to the particular video access device.

9. The system of claim 6, wherein the test controller collects and stores topology information with respect to the particular test equipment and its corresponding video access devices.

10. The system of claim 6, wherein the test controller is coupled to other test equipment, wherein each set of the other and particular test equipment has a separate corresponding set of video access devices.

11. A method of testing video access devices, the method comprising:
- detecting that a first video access device has initially become part of the system;
- connecting a test port of a first video access device to a wideband link of the first video access device in an internet protocol television system, by sending a command to connect the test port of the first video access device of the video access devices to its corresponding wideband link in response to detecting the first video access device;
- establishing connectivity directly between test equipment and the test port of the first video access device in response to detecting the first particular video access device;
- transmitting a video signal to the first video access device;
- transmitting a first video access device signal to the test equipment in response to the first video access device receiving the video signal, wherein the test equipment is remotely located from the first video access device; and
- receiving, at a test controller, a first measurement from the test equipment;
- wherein the video access devices include a particular video access device that is disposed within a housing, wherein the housing is exposed to an outdoor ambient;
- wherein the test equipment is located within a central office and wherein the video access devices each comprise a switch that directs content from the wideband link towards a customer premise equipment device or to the test port of the video access device and wherein the switch is controlled by a signal received at a control port of the video access device from the element management system.

12. The method of claim 11, further comprising sending a command from the test controller to an element management system to execute instructions to perform connecting the test port to the wideband link.

13. The method of claim 11, further comprising sending a command from the test controller to a video source to transmit the video signal, wherein transmitting the video signal is performed in response to the video source receiving the command.

14. The method of claim 13, wherein the video signal is transmitted from a super hub office or a video hub office.

15. The method of claim 14, wherein the video signal is associated with a dedicated test channel.

16. The method of claim 14, wherein the video signal is part of a test video clip.

17. The method of claim 11, wherein:
- the video access device is disposed within a housing, wherein the housing is exposed to an outdoor ambient; and
- the test equipment is located within a central office.

18. The method of claim 11, further comprising:
- connecting a test port of a second video access device to a wideband link of the second video access device;
- transmitting the video signal to the second video access device;
- transmitting a second video access device signal to the test equipment in response to the second video access device receiving the video signal, wherein the test equipment is remotely located from the second video access device; and
- transmitting a second measurement from the test equipment to a test controller, wherein the test equipment is stationary during and between times when the first and second video access device signals are received by the test equipment.

* * * * *